United States Patent [19]

Di Drusco et al.

[11] 4,332,933
[45] Jun. 1, 1982

[54] PROCESS FOR TREATING OLEFINIC POLYMERS WITH STEAM

[75] Inventors: Giovanni Di Drusco, Milan; Roberto Rinaldi, Mantova; Gabriele Govoni, Renazzo, all of Italy

[73] Assignee: Montedison S.p.A., Milan, Italy

[21] Appl. No.: 165,017

[22] Filed: Jul. 1, 1980

[30] Foreign Application Priority Data

Jul. 2, 1979 [IT] Italy ............................ 24033 A/79

[51] Int. Cl.³ .............................................. C08F 6/00
[52] U.S. Cl. ................................... 528/500; 422/139; 526/351; 528/499; 528/501; 528/502
[58] Field of Search ................. 528/500, 499; 526/351

[56] References Cited

U.S. PATENT DOCUMENTS

| | | | |
|---|---|---|---|
| 3,122,528 | 2/1964 | Hanesworth, Jr. | 528/500 |
| 3,127,385 | 3/1964 | Mostardini | 528/500 X |
| 3,296,240 | 1/1967 | MacDonald | 528/500 |
| 3,337,422 | 8/1967 | Colton | 528/500 X |
| 3,652,515 | 3/1972 | Love | 528/500 X |
| 3,772,262 | 11/1975 | Clementi | 528/500 |
| 4,029,877 | 6/1977 | Yoshiura | 528/483 |
| 4,180,636 | 12/1979 | Hirota | 526/125 |

FOREIGN PATENT DOCUMENTS

| | | | |
|---|---|---|---|
| 2451988 | 5/1976 | Fed. Rep. of Germany | 528/480 |
| 1420837 | 1/1976 | United Kingdom | 528/480 |
| 1507338 | 4/1978 | United Kingdom | 528/480 |

Primary Examiner—C. A. Henderson

[57] ABSTRACT

The halogen and organic substances content of the catalyst residues in alpha-olefin crystalline (co)-polymers prepared with catalysts obtained by reacting:

(a) a metallorganic Al compound with
(b) a Ti compound supported on a Mg halide, in which an electron-donor is combined with the Ti compound and/or the Mg compound and optionally with (a), are reduced by passing a stream of superheated steam (optionally mixed with other gaseous fluids) over the polymer in powder form at a temperature of 105°–140° C. and under a pressure of 0.1–10 kg/cm² gauge, the steam/polymer ratio being comprised between 0.10 and 1 by weight.

5 Claims, 3 Drawing Figures

PROCESS FOR TREATING OLEFINIC POLYMERS WITH STEAM

BACKGROUND OF THE INVENTION

Processes are known for preparing olefin polymers and copolymers in the presence of highly active catalysts obtained by reacting an organometallic Al compound with a Ti compound supported on a Mg dihalide, and in which an electron donor compound is combined with the Ti compound and/or the Mg compound and, optionally, also with the Al compound.

The catalysts employed in these processes permit the obtaining of such high polymer yields with respect to the Ti compound contained in the catalyst, as to avoid need for purifying the polymer from the catalyst residues.

In some applications, in particular in the alimentary and medico-sanitary fields, however, it is desirable to reduce to the absolute minimum possible the amount of said residues, in particular of the halogenated compounds and organic substances.

British Pat. No. 1,420,837 describes a method which results in a remarkable reduction of the halogen content in polyolefins prepared with conventional catalysts not supported on Mg dihalies, by treating the polymer with gaseous mixtures consisting of an olefinic oxide, in particular propylene oxide, nitrogen and vapor in appropriate ratios.

U.S. Pat. No. 4,029,877 describes a process for purifying polymers prepared with catalysts optionally comprising also a Mg dihalide as a support, such process consisting in treating the polyolefin powder with a weak-reactive gas consisting of a mixture of an inert gas with oxygen or vapor or the mixtures thereof, in which the oxygen concentration ranges from 0.05 to 0.5 and the vapor from 0.05 to 1% by moles. Said treatment results in improvement in the color characteristics of the polymer.

Processes capable of reducing the content of both halogenated substances and organic compounds in the olefin polymers prepared with catalysts supported on a Mg dihalide and comprising an electron-donor compound as catalyst modifier, have not been known heretofore.

THE PRESENT INVENTION

One object of this invention is to provide a process for reducing, to very low values, the catalyst residue content of crystalline olefinic homopolymers and copolymers obtained with the aid of highly active coordination catalysts.

This and other objects are achieved by the invention in accordance with which it is possible to reduce the content of both halogen and organic substances in polymers prepared in the presence of catalysts consisting of the product obtained by mixing an organometallic Al compound with a Ti compound supported on a Mg dihalide, and in which an electron-donor compound is combined with the Ti compound and/or Mg compound and, optionally, also with the organometallic compound.

It has now been found—and this is another aspect of our invention—that the present process reduces the content of volatile matters not utilized as catalyst components to very low values (lower than 5 ppm). Such substances are, in particular, the hydrocarbon solvents employed in the polymerization process.

The process of this invention consists in passing a stream of superheated steam having a temperature of from 105° to 140° C., over the polymer in powder form, and in maintaining the polymer at such a temperature as to prevent any steam condensation.

According to a preferred embodiment, the process consists in treating the polymeric powders with steam at temperatures ranging from 105° to 130° C. and in condensing the steam utilizing the condensation heat to regenerate new steam or for other uses as a heat source.

Figure 1:
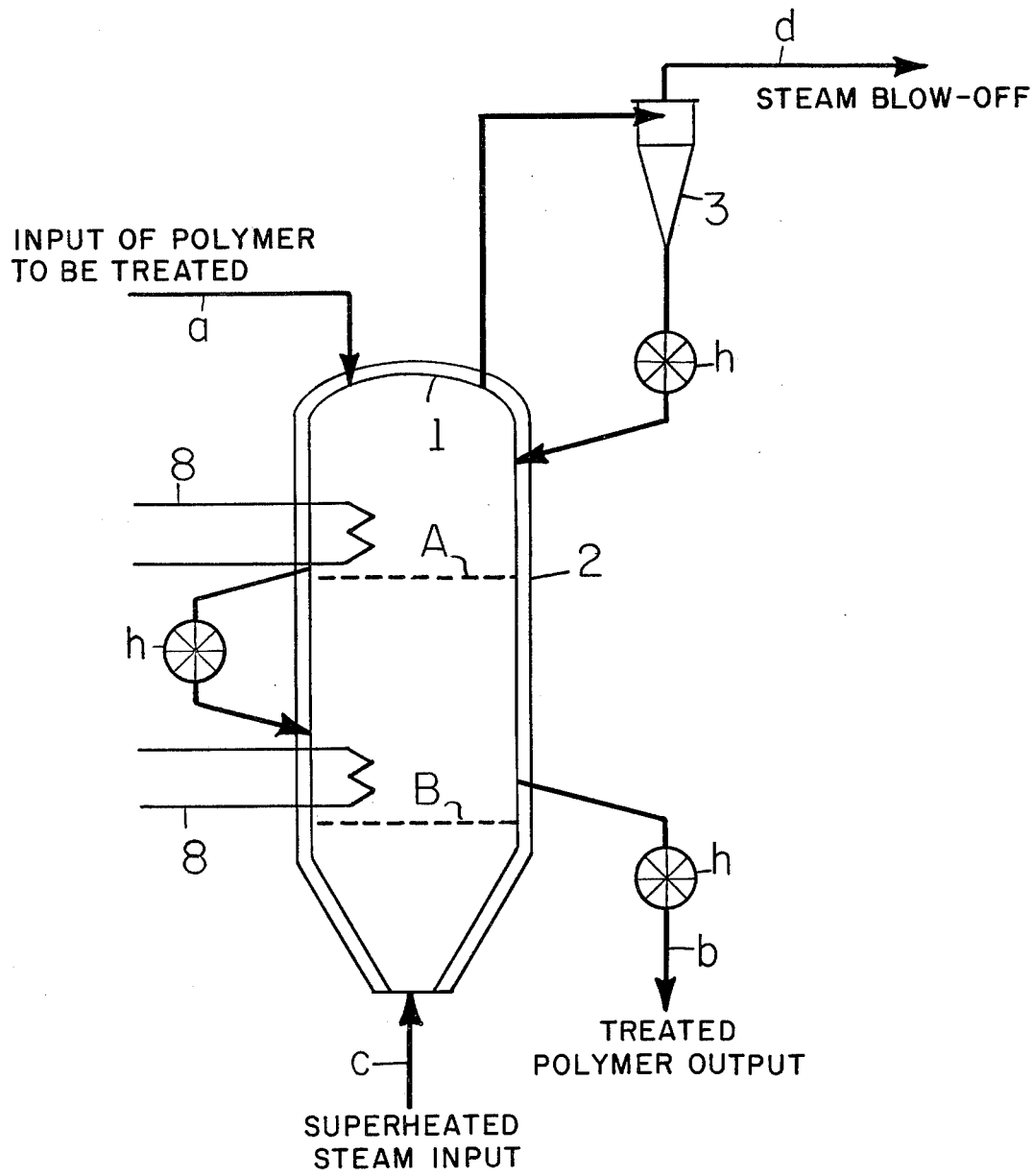
FIG. 1 is a schematic showing of one embodiment of the process of the invention and means for carrying it out.

Referring to the scheme of FIG. 1, the polymer to be treated is continuously fed, through line a preferably while still hot, to the upper part of a metal cylinder (1) the interior of which is divided into one or more sectors by fluidization trays (A, B).

The polymer level in each single sector is kept constant by means of known transport techniques, which collect the polymer from the higher tray and continuously unload it to the directly underlying tray; analogously the treated polymer is unloaded from the last tray of the cylinder to the outside.

A continuous stream (c) of superheated steam preferably having a temperature comprised between 105° C. and 130° C. is introduced into the cylinder through an inlet in the bottom thereof and, passing upwardly through the various fluidizing trays, hits all of the polymer layers to be treated, keeping them in fluidized bed conditions.

The heat required to increase the temperature of the polymer from the feeding temperature to the temperature of the fluid bed, as well as the latent vaporization heat of the volatile substances, are supplied to the system by suitable exchangers immersed in the fluid bed (8). Furthermore, to prevent water-condensation, the cylinder walls are heated by jacket (2).

The steam flow containing the substances separated from the purified polymer is continuously discharged from the cylinder top; such steam flow, after flowing through an optional powder separator (3), is blown off to the atmosphere as indicated by (d).

Figure 2:
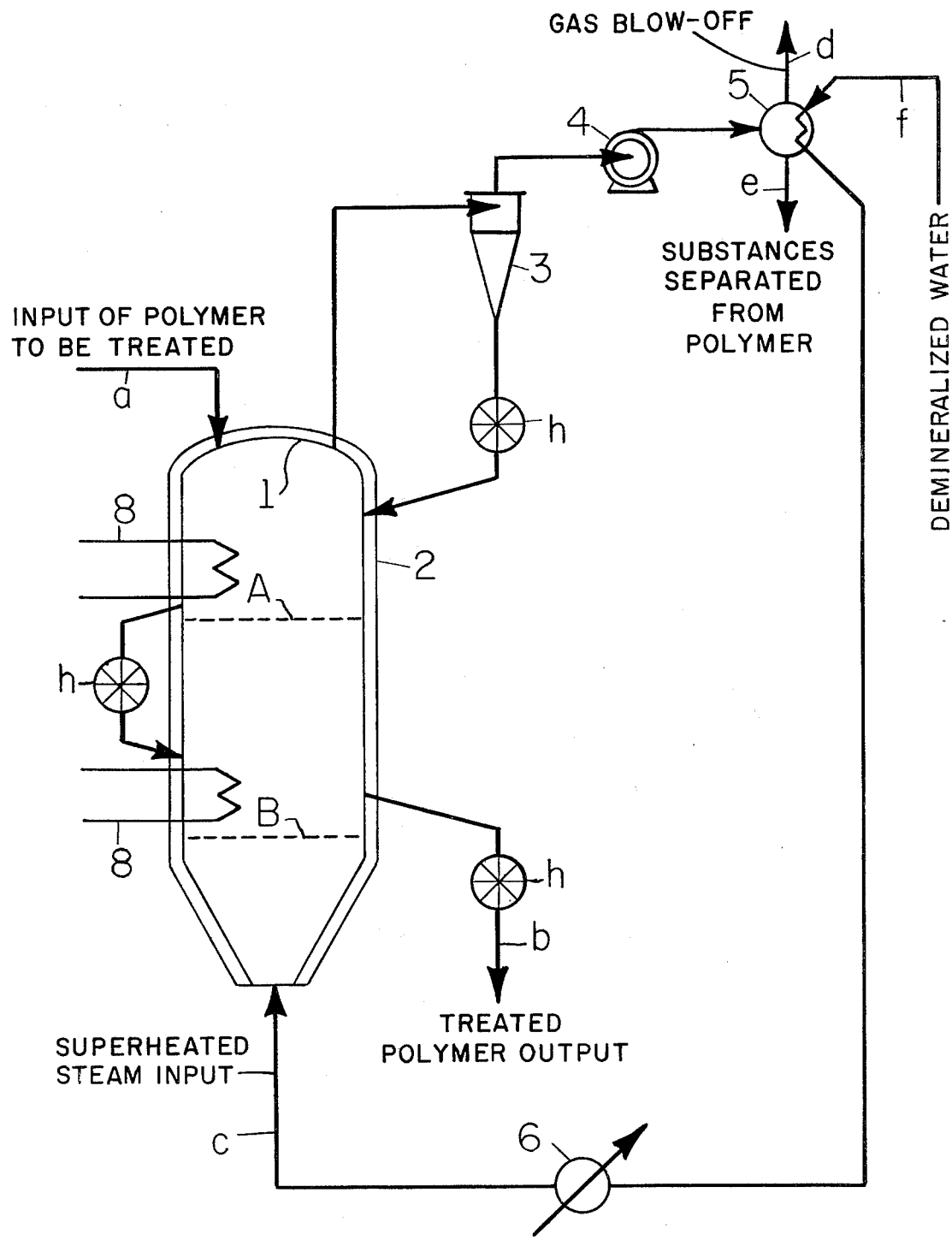
FIG. 2 is a schematic showing of another embodiment of the process of the invention and means for carrying it out.

Another embodiment of the process, shown schematically in FIG. 2, consists in that the steam flow, after separator (3), is sent to a heat exchanger (5), fed with demineralized water, after having optionally passed through a heat pump (4). In the heat exchanger 5, the steam condenses practically completely to water containing, in a dissolved or undissolved form, the substances separated from the polymer (e), and gases are exhausted at (d), while a proportionally equivalent amount of fresh steam, at a temperature of, for example, 110° C.–115° C., is regenerated, which is then ready to be sent again to the drier bottom, after having flowed through an optional superheater (6). Demineralized water enters heat exchanger 5 through line f. In both FIGS. 1 and 2, the treated polymer leaves the cylinder 1 through line b with the aid of pump h.

The use of pure steam in the process of the present invention permits the removal of the volatile substances and the catalyst residues in the most effective and less expensive manner, as the concentration gradient of such substances between the polymer and the steam (in which, at the inlet, the concentration is zero) is always the highest possible.

From the liquid discharged from exchanger (5), it is possible to recover the volatile substances of interest by operating according to conventional techniques.

Should the polymer contain large amounts of volatile solvents, it may be advisable, but not strictly necessary, to first subject such polymer to a pre-drying treatment according to known techniques, for example flash-drying.

The conditions under which the process of this invention can operate to provide good or satisfactory performances are comprised in a large range. As already indicated above, the steam temperature ranges from 105° to 140° C. and the pressure from 0.1 to 10 kg/cm$^2$ gauge; at any rate it is preferable to operate—as already explained herein—with steam at about 115° C., having a pressure of approximately 0.3 kg/cm$^2$ gauge and such a speed as to ensure the fluidization of the polymer in the drier; in many cases, for example a speed of 2–30 cm/sec.

The necessary contact time of the polymer with the steam is generally 15 to 90 minutes. The ratios by weight between steam and polymer are comprised between 0.1 and 1.

Figure 3:
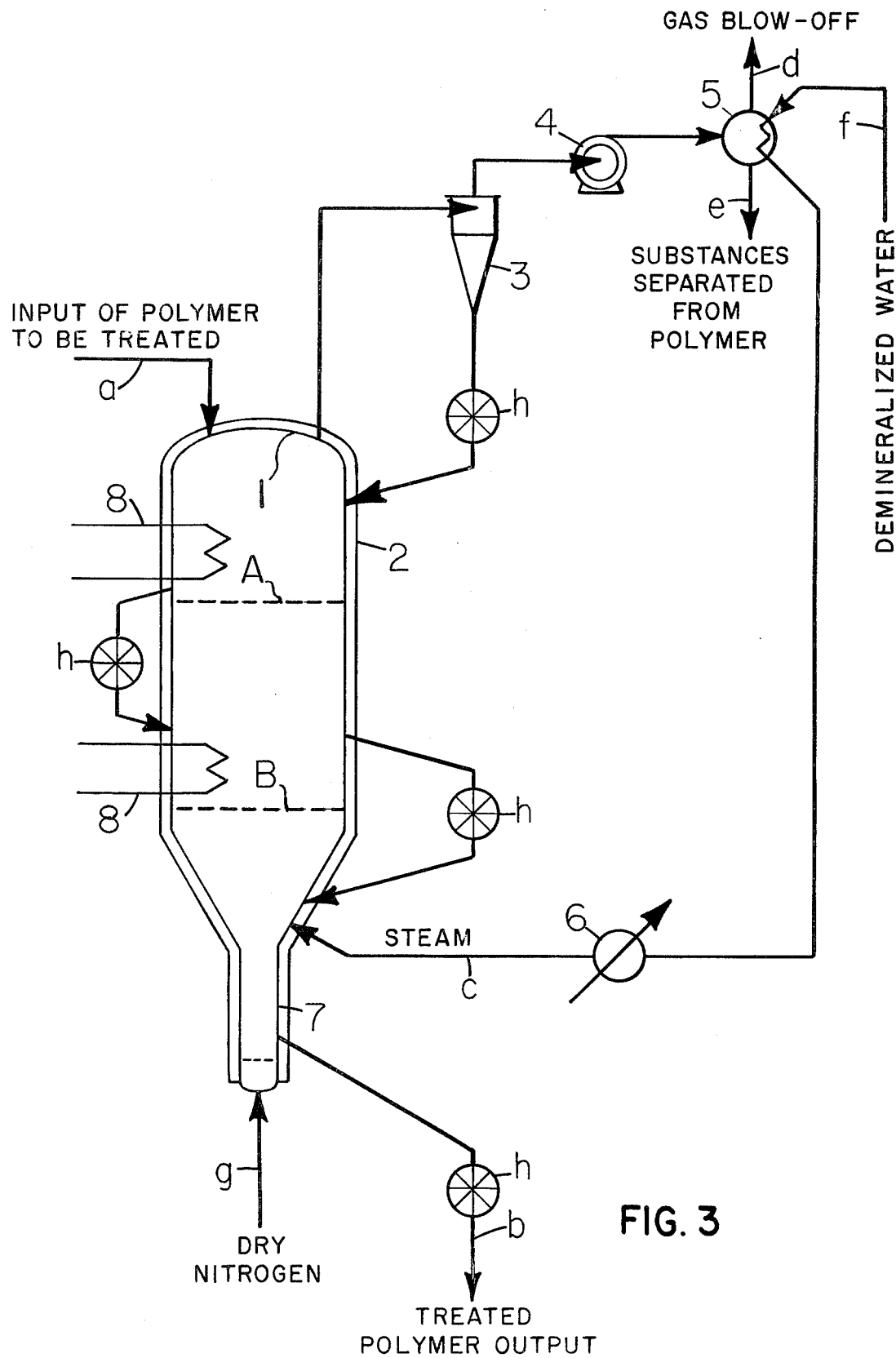
FIG. 3 is a schematic showing of still another embodiment of the invention and means for carrying it out.

Still another embodiment of the process of this invention is shown schematically in FIG. 3 of the drawing.

Such embodiment permits, if necessary, removal from the polymer of the residual humidity which, with the process described above, amounts to about 500–2000 ppm. of water.

According to the embodiment illustrated in FIG. 3, the polymer, at the conclusion of the treatment and when still warm, is sent, by (h), to terminal bed (7), through which dry nitrogen (g), or another inert gas, flows as fluidizing medium in order to remove the water vapor. The contact time is of a few minutes.

The little stream of moist nitrogen joins, in the drier, the vapor stream, and is then separated in exchanger (5) and blown off to the atmosphere.

Although pure vapor is the preferred medium, for the reasons explained herein, it is possible to employ, in the process of this invention, also vapor diluted with a gas, such as nitrogen, air, carbon dioxide, hydrogen, methane, methanol, etc. For example, vapor containing 1–10% of nitrogen can be used.

As already mentioned, the process of the present invention is particularly adapted to the treatment of powders of crystalline homo-polymers and copolymers of propylene and, in general, of alpha-olefins $CH_2=CHR$ where R is an alkyl having 1 to 4 carbon atoms, prepared with highly active catalysts comprising a Ti compound supported on Mg dihalides and an electron-donor compound.

Examples of catalysts useful to prepare polymers to be treated according to this invention are described in British Pat. Nos. 1,387,890; 1,387,889; 1,387,888 and in Belgian Pat. No. 848,527.

The polymers can be obtained either by polymerization in liquid phase in the presence or absence of an inert hydrocarbon solvent, or in the gas phase.

The treatment is preferably carried out on polymers which do not contain considerable amounts of the inert hydrocarbon solvents employed in the liquid phase polymerization process. Thus, the amount of such solvents present in the polymer to be treated should be less than 2–3% by weight.

It is pointed out that the use of vapor may facilitate, in some cases, the removal of the volatile solvents through the formation of azeotropes within the material subjected to the treatment.

The results obtainable with the present process are generally excellent as they permit to reduce, to very low values, even below 1 ppm, and independently of the initial content, the volatile substances not deriving from the catalyst residues. These very low values can be obtained without any sensible additional energy consumption, and merely by adequately increasing the number of fluidization plates or trays arranged in series in the drier.

According to a further embodiment of the invention, a drier of the type shown in FIGS. 1 or 2 and equipped with an internal stirring system is utilized. With this stirring system, which keeps the polymeric powder in motion, it is possible to drastically reduce the vapor amount to that strictly necessary for removing the volatile substances and reducing the catalyst residues content, as it is no longer ncessary to relate the vapor amount to the maintenance of the fluidization state.

The following example is given to illustrate the present invention, without being, however, a limitation thereof.

EXAMPLE

The polypropylene to be treated with steam was obtained by polymerization of propylene according to conventional techniques, in the presence of hexane as a solvent, and using a catalyst prepared according to Belgian Pat. No. 848,527 by reacting Al-triethyl complexed with 0.3 moles of ethyl benzoate (EB) as electron-donor per mole of Al-triethyl, with a solid component prepared by reacting $TiCl_4$ in excess of 80° C. with a co-milled compound of $MgCl_2$ and EB, the molar ratio between $MgCl_2$ and EB being 5:1. The catalytic component contained the following percentages by weight: Ti=2%, Cl=60%, Mg=18%, EB=10%. The Cl content in the polymer was 100 ppm, the EB content was 10 ppm.

The polypropylene in powder form, coming from a flash-drying plant and containing about 3% by weight of hexane, was fed to a drier of the type schematically shown in FIG. 3.

The drier was made of stainless steel AISI 316 L and consisted of two beds, one placed upon the other, each of them equipped with a fluidization plate. The drier was completely jacketed, and in the upper bed also an additional heating surface was provided. The levels of the two beds were maintained constant by a proper overflow of the powder. A radial valve, located downstream of the overflow, permitted the unloading onto the underlying bed. From the overflow of the lower bed a second radial valve unloaded the powder into an underlying tank, in which a slight nitrogen injection removed the water vapor discharged with the powder.

Temperature feelers were arranged on each bed. The (constant) diameter of the drier was of 500 mm. The overflow height of the beds was fixed at 500 mm from the fluidization plate. Under the test conditions, the jacket of the drier and the inside surface inserted in the upper bed were fed with dry saturated steam at 0.7 kg/cm$^2$ rel. The condensate was discharged through suitable traps.

The powder coming from the flash-drying plant was unloaded, by a radial valve, onto the top of the upper bed. Steam flowing from the source of saturated steam at 0.7 kg/cm$^2$ gauge was fed, by means of a proper flow regulator, under the lower bed. A proper insulation of the line permitted the feeding of steam to the bed at 113°–114° C., i.e., in overheating conditions (corresponding to the pressure drops of the downsteam circuit).

The small amounts of powders leaving the drier along with the gas were collected by a centrifugal separator and sent to the drier. The gases flowing out from the centrifugal separator were condensed. Hexane was recovered by decantation of the condensate.

The steam capacity fed to the fluid bed depended on the necessity of maintaining a fluidization state in the drier. The ratio by weight between steam and polymer was 0.5. The residence time of the polymer was 50 minutes. Under such conditions, the powder left the fluid bed at a temperature of 108°–110° C.

Repeated analyses of such powder show a hexane content below 20 ppm and a water content below 500 ppm, while the chlorine content was 60 ppm and that of EB lower that 1 ppm.

What we claim is:

1. A process for reducing the content of catalyst residues, halogenated compounds and organic substances, contained in the crystalline olefinic homopolymers and copolymers prepared by (co)polymerization of olefins with catalysts obtained by reacting an organometallic Al compound with a Ti compound, in which the Ti compound is supported on a Mg halide, and an electron-donor compound is combined with the Ti compound and/or the Mg compound said process consisting in causing a stream of superheated steam having a temperature of from 105° to 140° C. and a pressure of from 0.1 to 10 kg/cm$^2$ gauge, to pass over the polymer in powder form in a ratio by weight between steam and polymer ranging from 0.10 to 1, and maintaining the polymer at such a temperature so as to prevent steam condensation.

2. The process of claim 1, in which the polymer powder is sent into a cylinder comprising one or more fluidization trays where, maintaining fluidized bed conditions, it flows in countercurrent with superheated steam, and the steam leaving the cylinder is condensed to regenerate the steam utilized for treating the powder.

3. The process of claims 1 or 2, in which the polymer powder is sent into a cylinder equipped with a stirrer, where it flows in countercurrent with superheated steam, and the steam is condensed when leaving the cylinder in order to regenerate the steam utilized for treating the polymer.

4. The process of claims 1 or 2, in which water vapor in admixture with other gaseous fluids is utilized as fluidizing medium.

5. The process of claim 1, in which the catalyst is obtained by reacting an organometallic Al compound with a Ti compound, the Ti compound is supported on a Mg halide, and an electron-donor compound is combined with the Ti compound, and/or the Mg compound, and also with the organometallic Al compound.

* * * * *